United States Patent
Kapadia et al.

(10) Patent No.: US 10,592,687 B2
(45) Date of Patent: Mar. 17, 2020

(54) METHOD AND SYSTEM OF ENFORCING PRIVACY POLICIES FOR MOBILE SENSORY DEVICES

(71) Applicant: INDIANA UNIVERSITY RESEARCH AND TECHNOLOGY CORPORATION, Indianapolis, IN (US)

(72) Inventors: Apu Kapadia, Bloomington, IN (US); Robert E. Templeman, Bloomington, IN (US); David Crandall, Bloomington, IN (US); Mohammed Korayem, Bloomington, IN (US)

(73) Assignees: Indiana University Research and Technology Corporation, Indianapolis, IN (US); United States of America as Represented by The Secretary of The Navy, Arlington, VA (US)

( * ) Notice: Subject to any disclaimer, the term of this patent is extended or adjusted under 35 U.S.C. 154(b) by 95 days.

(21) Appl. No.: 15/029,559

(22) PCT Filed: Oct. 9, 2014

(86) PCT No.: PCT/US2014/059851
§ 371 (c)(1),
(2) Date: Apr. 14, 2016

(87) PCT Pub. No.: WO2015/102711
PCT Pub. Date: Jul. 9, 2015

(65) Prior Publication Data
US 2016/0239682 A1     Aug. 18, 2016

Related U.S. Application Data

(60) Provisional application No. 61/890,654, filed on Oct. 14, 2013.

(51) Int. Cl.
*G06F 21/00* (2013.01)
*G06F 21/62* (2013.01)
(Continued)

(52) U.S. Cl.
CPC .......... *G06F 21/6245* (2013.01); *G06F 16/51* (2019.01); *G06F 16/5838* (2019.01);
(Continued)

(58) Field of Classification Search
CPC .......... G06F 21/6245; G06F 17/30268; G06F 17/30259; G06F 17/30262; G06F 17/3028;
(Continued)

(56) References Cited

U.S. PATENT DOCUMENTS 8,365,243 B1    1/2013  Lu et al.
8,385,591 B1 *  2/2013  Anguelov ......... G06F 17/30241
                                                            340/988

(Continued)

FOREIGN PATENT DOCUMENTS

WO    WO 2015/102711    7/2015

OTHER PUBLICATIONS

International Search Report and Written Opinion issued by the ISA/US, Commissioner for Patents, dated Jun. 25, 2015 for International Application No. PCT/US2014/059851; 6 pages.

(Continued)

*Primary Examiner* — Brandon S Hoffman
*Assistant Examiner* — William A Corum, Jr.
(74) *Attorney, Agent, or Firm* — Faegre Drinker Biddle & Reath LLP

(57) ABSTRACT

A method and device for classifying collected images. The method and device include instructions to compare a captured image to a known set of images to determine the location depicted therein; and applying a classification upon (Continued)

the image based upon the determined location depicted therein and whether the determined location indicates that the image has the potential to depict privacy sensitive information.

20 Claims, 5 Drawing Sheets

(51) Int. Cl.
    *G06F 16/51*         (2019.01)
    *G06F 16/583*      (2019.01)
    *G06F 16/58*        (2019.01)
    *G06K 9/62*         (2006.01)
    *G06K 9/00*         (2006.01)
    *G06K 9/46*         (2006.01)
    *G06K 9/78*         (2006.01)

(52) U.S. Cl.
    CPC ...... *G06F 16/5854* (2019.01); *G06F 16/5862* (2019.01); *G06F 16/5866* (2019.01); *G06K 9/00664* (2013.01); *G06K 9/00771* (2013.01); *G06K 9/4671* (2013.01); *G06K 9/6202* (2013.01); *G06K 9/6267* (2013.01); *G06K 9/6297* (2013.01); *G06K 9/78* (2013.01)

(58) Field of Classification Search
    CPC .. G06F 17/30256; G06K 9/78; G06K 9/6267; G06K 9/4671; G06K 9/6202; G06K 9/6297; G06K 9/00771; G06K 9/00664
    See application file for complete search history.

(56) References Cited

U.S. PATENT DOCUMENTS

| | | | |
|---|---|---|---|
| 2004/0125216 A1 | 7/2004 | Keskar et al. | |
| 2010/0310182 A1* | 12/2010 | Kroepfl | G06K 9/00624 382/216 |
| 2011/0282897 A1* | 11/2011 | Li | G06F 17/30241 707/769 |
| 2012/0106854 A1* | 5/2012 | Tang | G06K 9/62 382/224 |
| 2014/0289850 A1* | 9/2014 | Yu | H04W 8/16 726/22 |
| 2015/0033362 A1* | 1/2015 | Mau | G06K 9/00288 726/27 |
| 2015/0049955 A1* | 2/2015 | Stoeffler | G06K 9/6202 382/220 |
| 2015/0106950 A1* | 4/2015 | Holman | G06F 21/6245 726/26 |

OTHER PUBLICATIONS

A. Allen, "Dredging up the past: Lifelogging, memory, and surveillance," *The University of Chicago Law Review*, pp. 47-74, 2008; 29 pages.

S. Arya and D. Mount, "Approximate nearest neighbor queries in fixed dimensions," in *ACM Symposium on Discrete Algorithms*, 1993; 10 pages.

S. Bambach, D. Crandall, and C. Yu, "Understanding embodied visual attention in child-parent interaction," in *Joint IEEE International Conference on Development and Learning and on Epigenetic Robots*, 2013; 6 pages.

J. Brassil, "Technical challenges in location-aware video surveillance privacy," in *Protecting Privacy in Video Surveillance*. Springer, 2009, pp. 91-113; 23 pages.

S. Bugiel, L. Davi, A. Dmitrienko, T. Fischer, and A.R. Sadeghi, "XManDroid: A new Android evolution to mitigate privilege escalation attacks," Technische Universität Darmstadt, Technical Report TR-2011-04, Apr. 2011; 18 pages.

S. Bugiel, L. Davi, A. Dmitrienko, T. Fischer, A.R. Sadeghi, and B. Shastry, "Towards taming privilege-escalation attacks on Android," in *19th Annual Network & Distributed System Security Symposium(NDSS)*, Feb. 2012; 18 pages.

J. Chaudhari, S. Cheung, and M. Venkatesh, "Privacy protection for life-long video," in *IEEE Workshop on Signal Processing Applications for Public Security and Forensics*, 2007, pp. 1-5; 5 pages.

W. Cheng, L. Golubchik, and D. Kay, "Total recall: are privacy changes inevitable?" in *ACM Workshop on Continuous Archival and Retrieval of Personal Experiences*, 2004, pp. 86-92; 7 pages.

Y. Chon, N. Lane, F. Li, H. Cha, and F. Zhao, "Automatically characterizing places with opportunistic crowd sensing using smartphones," in *ACM Conference on Ubiquitous Computing*, 2012, pp. 481-490; 10 pages.

M. Conti, V.T.N. Nguyen, and B. Crispo, "Crepe: context-related policy enforcement for Android," in *International Conference on Information Security*, 2011, pp. 331-345; 15 pages.

N. Dalal and B. Triggs, "Histograms of Oriented Gradients for Human Detection," in *IEEE Conference on Computer Vision and Pattern Recognition*, 2005, pp. 886-893; 8 pages.

M. Dietz, S. Shekhar, Y. Pisetsky, A. Shu, and D.S. Wallach, "Quire: Lightweight provenance for smart phone operating systems," *CoRR*, vol. abs/1102.2445, 2011; 16 pages.

M. Douze, H. Jegou, H. Sandhawalia, L. Amsaleg, and C. Schmid, "Evaluation of gist descriptors for web-scale image search," in *ACM International Conference on Image and Video Retrieval*, 2009; 8 pages.

K. Duan, D. Batra, and D. Crandall, "A Multi-layer Composite Model for Human Pose Estimation," in *British Machine Vision Conference*, 2012; 11 pages.

W. Enck, P. Gilbert, B.G. Chun, L.P. Cox, J. Jung, P. McDaniel, and A.N. Sheth, "TaintDroid: An information-flow tracking system for realtime privacy monitoring on smartphones," in *USENIX Conference on Operating Systems Design and Implementation*, 2010, pp. 1-6; 29 pages.

W. Enck, M. Ongtang, and P. McDaniel, "Mitigating Android software misuse before it happens," Pennsylvania State University, Tech Rep. NAS-TR-0094-2008, 2008; 17 pages.

R. Fan, K. Chang, C. Hsieh, X. Wang, and C. Lin, "Liblinear: A library for large linear classification," *The Journal of Machine Learning Research*, vol. 9, pp. 1871-1874, 2008; 4 pages.

A. Fathi, X. Ren, and J. Rehg, "Learning to recognize objects in egocentric activities," in *IEEE Conference on Computer Vision and Pattern Recognition*, 2011; 8 pages.

A.P. Felt, H.J. Wang, A. Moshchuk, S. Hanna, and E. Chin, "Permission Re-Delegation: Attacks and Defenses," in *Proceedings of the USENIX Conference on Security*, 2011, pp. 22-22; 16 pages.

J.M. Frahm, P. Georgel, D. Gallup, T. Johnson, R. Raguram, C. Wu, Y.H. Jen, E. Dunn, B. Clipp, and S. Lazebnik, "Building Rome on a Cloudless Day," in *European Conference on Computer Vision*, 2010; 14 pages.

A. Gionis, P. Indyk, R. Motwani et al., "Similarity search in high dimensions via hashing," in *IEEE International Conference on Very Large Data Bases*, vol. 99, 1999, pp. 518-529; 12 pages.

J. Halderman, B. Waters, and E. Felten, "Privacy management for portable recording devices," in *ACM Workshop on Privacy in the Electronic Society*, 2004, pp. 16-24; 9 pages.

J. Hightower and G. Borriello, "Location systems for ubiquitous computing," Computer, vol. 34, No. 8, pp. 57-66, Aug. 2001; 10 pages.

S. Hodges, L. Williams, E. Berry, S. Izadi, J. Srinivasan, A. Butler, G. Smyth, N. Kapur, and K. Wood, "SenseCam: a retrospective memory aid," in *ACM Conference on Ubiquitous Computing*, 2006; 17 pages.

C. Hsu, C. Lu, and S. Pei, "Homomorphic encryption-based secure sift for privacy-preserving feature extraction," in IS&T/SPIE Electronic Imaging, 2011; 17 pages.

S. Jana, A. Narayanan, and V. Shmatikov, "A Scanner Darkly: Protecting user privacy from perceptual applications," in *34th IEEE Symposium on Security and Privacy*, 2013; 15 pages.

P. Jensfelt, D. Kragic, J. Folkesson, and M. Bjorkman, "A framework for vision based bearing only 3D slam," in *Robotics and*

(56) References Cited

OTHER PUBLICATIONS

*Automation, 2006. ICRA 2006. Proceedings 2006 IEEE International Conference on.* IEEE, 2006, pp. 1944-1950; 7 pages.

T. Karkkainen, T. Vaittinen, and K. Vaananen-Vainio-Mattila, "I don't mind being logged, but want to remain in control: a field study of mobile activity and context logging," in *SIGCHI Conference on Human Factors in Computing Systems*, 2010, pp. 163-172; 10 pages.

M. Korayem, A. Mohamed, D. Crandall, and R. Yampolskiy, "Solving avatar captchas automatically," in Advanced Machine Learning Technologies and Applications, 2012, pp. 2-9; 9 pages.

J. Kosecka' and F. Li, "Vision based topological markov localization," in *Robotics and Automation, 2004. Proceedings. ICRA'04. 2004 IEEE International Conference on*, vol. 2. IEEE, 2004, pp. 1481-1486; 6 pages.

M. Kourogi and T. Kurata, "Personal positioning based on walking locomotion analysis with self-contained sensors and a wearable camera," in *IEEE and ACM International Symposium on Mixed and Augmented Reality*, 2003, pp. 103-112; 10 pages.

S. Lazebnik, C. Schmid, and J. Ponce, "Beyond bags of features: Spatial pyramid matching for recognizing natural scene categories," in *IEEE Conference on Computer Vision and Pattern Recognition*, 2006; 8 pages.

L. Ledwich and S. Williams, "Reduced SIFT features for image retrieval and indoor localisation, " in *Australian Conference on Robotics and Automation*, 2004; 8 pages.

Y.J. Lee, J. Ghosh, and K. Grauman, "Discovering important people and objects for egocentric video summarization," in *IEEE Conference on Computer Vision and Pattern Recognition*, 2012; 8 pages.

X. Li, C. Wu, C. Zach, S. Lazebnik, and J.M. Frahm, "Modeling and Recognition of Landmark Image Collections Using Iconic Scene Graphs," in *European Conference on Computer Vision*, 2008, pp. 427-440; 28 pages.

Y. Li, D. Crandall, and D.P. Huttenlocher, "Landmark Classification in Large-scale Image Collections," in *IEEE International Conference on Computer Vision*, 2009; 8 pages.

D.G. Lowe, "Distinctive image features from scale-invariant keypoints," International Journal of Computer Vision, vol. 60, No. 2, pp. 91-110, Nov. 2004; 28 pages.

E. Miluzzo, N. Lane, K. Fodor, R. Peterson, H. Lu, M. Musolesi, S. Eisenman, X. Zheng, and A. Campbell, "Sensing meets mobile social networks: the design implementation and evaluation of the cenceme application," in *ACM Conference on Embedded Network Sensor Systems*, 2008, pp. 337-350; 14 pages.

M. Nauman, S. Khan, and X. Zhang, "Apex: Extending Android permission model and enforcement with user-defined runtime constraints," in *ACM Symposium on Information, Computer and Communications Security*, 2010, pp. 328-332; 5 pages.

A. Oliva and A. Torralba, "Modeling the shape of the scene: A holistic representation of the spatial envelope," *International Journal of Computer Vision*, vol. 42, No. 3, pp. 145-175, 2001; 31 pages.

M. Ongtang, K. Butler, and P. McDaniel, "Porscha: Policy oriented secure content handling in Android," in *Annual Computer Security Applications Conference*, 2010, pp. 221-230; 10 pages.

H. Pirsiavash and D. Ramanan, "Detecting activities of daily living in first-person camera views," in *IEEE Conference on Computer Vision and Pattern Recognition*, 2012; 8 pages.

G. Portokalidis, P. Homburg, K. Anagnostakis, and H. Bos, "Paranoid Android: Versatile protection for smartphones," in *Annual Computer Security Applications Conference*, 2010, pp. 347-356; 10 pages.

A. Quattoni and A. Torralba, "Recognizing indoor scenes," in *IEEE Conference on Computer Vision and Pattern Recognition*, 2009; 8 pages.

F. Roesner, T. Kohno, A. Moshchuk, B. Parno, H.J. Wang, and C. Cowan, "User-driven access control: Rethinking permission granting in modern operating systems," in *IEEE Symposium on Security and Privacy*, 2012, pp. 224-238; 15 pages.

A. Savvides, C. Han, and M. Strivastava, "Dynamic fine-grained localization in ad-hoc networks of sensors," in *International Conference on Mobile Computing and Networking*, 2001, pp. 166-179; 14 pages.

J. Schiff, M. Meingast, D. Mulligan, S. Sastry, and K. Goldberg, "Respectful cameras: Detecting visual markers in real-time to address privacy concerns," in *Protecting Privacy in Video Surveillance*. Springer, 2009, pp. 65-89; 26 pages.

S. Se, D. Lowe, and J. Little, "Mobile robot localization and mapping with uncertainty using scale-invariant visual landmarks," *International Journal of Robotics Research*, vol. 21, No. 8, pp. 735-758, 2002; 24 pages.

"Vision-based global localization and mapping for mobile robots," *IEEE Transactions on Robotics*, vol. 21, No. 3, pp. 364-375, 2005; 12 pages.

"Global localization using distinctive visual features," in *IEEE International Conference on Intelligent Robots and Systems*, 2002, pp. 226-231; 6 pages.

N. Snavely, S. Seitz, and R. Szeliski, "Modeling the World from Internet Photo Collections," International Journal of Computer Vision, vol. 80, pp. 189-210, 2008; 22 pages.

R. Templeman, Z. Rahman, D. Crandall, and A. Kapadia, "PlaceRaider: Virtual theft in physical spaces with smartphones," in *Network and Distributed System Security Symposium*, Feb. 2013; 21 pages.

K. Truong, S. Patel, J. Summet, and G. Abowd, "Preventing camera recording by designing a capture-resistant environment," in *International Conference on Ubiquitous Computing*, 2005, pp. 73-86; 14 pages.

I. Ulrich and I. Nourbakhsh, "Appearance-based place recognition for topological localization," in *IEEE International Conference on Robotics and Automation*, 2000, pp. 1023-1029; 7 pages.

O. Woodman and R. Harle, "Pedestrian localisation for indoor environments," in *International Conference on Ubiquitous Computing*, 2008, pp. 114-123; 10 pages.

J. Xiao, J. Hays, K. Ehinger, A. Oliva, and A. Torralba, "SUN database: Large-scale scene recognition from abbey to zoo," in *IEEE Conference on Computer Vision and Pattern Recognition(CVPR)*, 2010, pp. 3485-3492; 8 pages.

International Preliminary Report of Patentability issued by the International Bureau of WIPO, dated Apr. 19, 2016, for International Patent Application No. PCT/US2014/059851; 5 pages.

D. Kollar and N. Friedman, Probabilistic Graphical Models: Principles and Techniques. The MIT Press. 2009.

\* cited by examiner

Table I

Summary of our datasets. All datasets have five rooms (classes). Majority-class baselines are shown. For House 3, three rounds were taken with an HTC Amaze, one with a digital SLR camera, and one with a SAMSUNG GT-S5360L phone

| | | Enrollment photos | | | | | Test photo streams | | |
|---|---|---|---|---|---|---|---|---|---|
| Dataset | Device | Native resolution | # of images | # of rounds | Mean # of images/ rooms | Baseline accuracy | Device | Native resolution | # of images | Baseline accuracy |
| House 1 | iPhone 4S | 8MP | 184 | 3 | 61 | 22.8% | iPhone 4S | 8MP | 323 | 29.8% |
| House 2 | iPhone 5 | 8MP | 248 | 3 | 83 | 29.9% | iPhone 5 | 8MP | 629 | 31.0% |
| House 3 | (see caption) | 3-6MP | 255 | 5 | 85 | 30.2% | HTC Amaze | 6MP | 464 | 20.9% |
| Workplace 1 | Motorola EVO | 5MP | 733 | 3 | 244 | 24.4% | HTC Amaze | 6MP | 511 | 32.1% |
| Workplace 2 | HTC Amaze | 6MP | 323 | 5 | 108 | 25.4% | HTC Amaze | 6MP | 457 | 28.9% |

Table II

Local feature classifier trained and tested on enrollment images using cross-validation.

| | | Native-sized images | | | Downsampled images (IMP) | | |
|---|---|---|---|---|---|---|---|
| Dataset | Baseline accuracy | Classification accuracy | Mean # of features | # of images with ties 5-way tie | Classification accuracy | Mean # of features | # of images with ties 5-way tie |
| House 1 | 22.8% | 98.4% | 297 | 2 | 98.4% | 249 | 0 |
| House 2 | 29.9% | 76.2% | 209 | 27 | 77.4% | 66 | 50 |
| House 3 | 30.2% | 95.7% | 59 | 12 | 96.9% | 352 | 2 |
| Workplace 1 | 24.4% | 84.0% | 33 | 115 | 86.8% | 31 | 133 |
| Workplace 2 | 25.4% | 92.9% | 104 | 15 | 93.5% | 44 | 39 |
| Average | 26.5% | 89.4% | | | 90.6% | | |

Fig. 3A

Table III

Global feature classifier trained and tested on enrollment images using cross-validation.

| Dataset | Baseline accuracy | Bags of SIFT | Dense bags of SIFT | Bags of HOG | LBP | GIST | RGB histogram |
|---|---|---|---|---|---|---|---|
| House 1 | 22.8% | 89.1% | 81.4% | 82.7% | 41.6% | 71.9% | 57.4% |
| House 2 | 29.9% | 49.7% | 78.8% | 78.7% | 52.8% | 64.8% | 47.9% |
| House 3 | 32% | 89.4% | 68.9% | 66.2% | 51.9% | 65.5% | 57.4% |
| Workplace 1 | 24.4% | 83.2% | 93.9% | 88.8% | 76.2% | 85.1% | 79.8% |
| Workplace 2 | 25.4% | 73.8% | 83.1% | 83.2% | 67.5% | 72.2% | 55.0% |
| Average | 26.5% | 77.0% | 81.2% | 79.9% | 58.0% | 71.9% | 59.5% |

Table IV

Classification of test streams by the single image classifiers and variations of the HMM.

| | | Single image classifier | | | Joint stream classifier | | |
|---|---|---|---|---|---|---|---|
| Dataset | Baseline accuracy | Local features | Global features | Local features | Global features | Local+Global features | Local+Global+human interaction |
| House 1 | 29.8% | 52.9% | 48.3% | 89.2% | 64.0% | 89.2% | 95.0% |
| House 2 | 31.0% | 41.8% | 49.1% | 55.0% | 56.4% | 74.6% | 76.8% |
| House 3 | 20.9% | 81.5% | 80.0% | 97.4% | 86.9% | 98.7% | 99.8% |
| Workplace 1 | 32.1% | 75.9% | 74.6% | 75.5% | 89.2% | 87.7% | 91.0% |
| Workplace 2 | 28.9% | 71.6% | 69.4% | 92.3% | 81.2% | 98.7% | 100.0% |
| Average | 28.5% | 64.7% | 64.3% | 81.9% | 74.8% | 89.8% | 92.5% |

Fig. 3B

METHOD AND SYSTEM OF ENFORCING PRIVACY POLICIES FOR MOBILE SENSORY DEVICES

PRIORITY

The present disclosure is a a national phase of International Application No. PCT/US14/59851, titled A METHOD AND SYSTEM OF ENFORCING PRIVACY POLICIES FOR MOBILE SENSORY DEVICES, which claims priority to U.S. Provisional Application Ser. No. 61/890,654, titled A METHOD AND SYSTEM OF ENFORCING PRIVACY POLICIES FOR MOBILE SENSORY DEVICES, filed Oct. 14, 2013, the entire contents of both disclosures are incorporated herein by reference in their entireties.

GOVERNMENT INTEREST

This invention was made with government support under CNS-1016603, CNS1252697, and IIS-1253549 awarded by the National Science Foundation. The Government has certain rights in the invention.

FIELD OF THE DISCLOSURE

The present disclosure is related to methods and devices to support the creation of exclusion zones where audio and/or video capturing is prevented. The present disclosure is related more specifically to methods and devices for audio/video capturing devices to quarantine audio/video files captured thereby that present a high likelihood of depicting privacy sensitive subject matter.

BACKGROUND

Handheld/portable computing devices, such as smart phones, possess increasing computing power. Such devices further include multiple sensors that can be used to capture data about the environment in which they are located. These devices have the ability to record audio and/or video. In some instances, such as "life logging" devices, the periodic and/or constant capturing of this media is desired. Examples of such devices include those sold under the trade names of Memoto, Autographer, and Google Glass. As a user continues to use such a device, it becomes increasingly possible that the user will forget that the device is capturing media. Accordingly, it becomes possible for a user to transport such a device into a privacy sensitive area where it is not welcome. Still further, some professions such as physicians and other workers handling personally identifiable medical information (or other similarly sensitive data) present the possibility of workplace violations (such as HIPPA violations) in the event of private information being captured.

In addition to the examples where a user has voluntarily established the media capture, the media capturing devices are also potential avenues for criminals to commandeer (hack) to then use the media capturing capabilities to ascertain private facts (such as those useful in identity theft).

Accordingly, there exists a need for a multimedia device to have a "blacklist" of locations, either configured by the user or otherwise, that cause media gathered therefrom to be quarantined prior to being made available to the device generally.

According to one embodiment of the present disclosure, a method classifying collected images is provided. The method including executing on a computing device instructions to compare a captured image to a known set of images to determine the location depicted therein; and applying a classification upon the image based upon the determined location depicted therein and whether the determined location indicates that the image has the potential to depict privacy sensitive information.

According to another embodiment of the present disclosure, an image handling device is provided. The device including an image capturing device; one or more applications able to utilize images from the image capturing device; and memory storing instructions, that when interpreted by a processor instantiate a system layer logically disposed between the image capturing device and the one or more applications such that images captured by the image capturing device must pass through the system layer prior to being made available to the one or more applications. The system layer includes an image classifier, a plurality of image policy rules; and an image policy enforcer operable to apply the policy rules to an image received thereby according to the classification of the image by the image classifier. The image policy enforcer operable to choose between: making the image freely available to the one or more applications; making the image or portion of the image unavailable; and holding the image and requiring explicit approval from a user prior to making the image available to the one or more applications.

In yet another embodiment of the present disclosure, a non-transitory computer readable media is provided including instructions thereon that, when interpreted by a processor, cause the processor to compare a captured image to a known set of images to determine the location depicted therein; and apply a classification upon the image based upon the determined location depicted therein and whether the determined location indicates that the image has the potential to depict privacy sensitive information.

BRIEF DESCRIPTION OF THE DRAWINGS

The above-mentioned aspects of the present teachings and the manner of obtaining them will become more apparent and the teachings will be better understood by reference to the following description of the embodiments taken in conjunction with the accompanying drawings, wherein.

DETAILED DESCRIPTION OF EMBODIMENTS

The embodiments disclosed herein are not intended to be exhaustive or limit the invention to the precise form disclosed in the following detailed description. Rather, the embodiments were chosen and described so that others skilled in the art may utilize their teachings.

Figure 1:
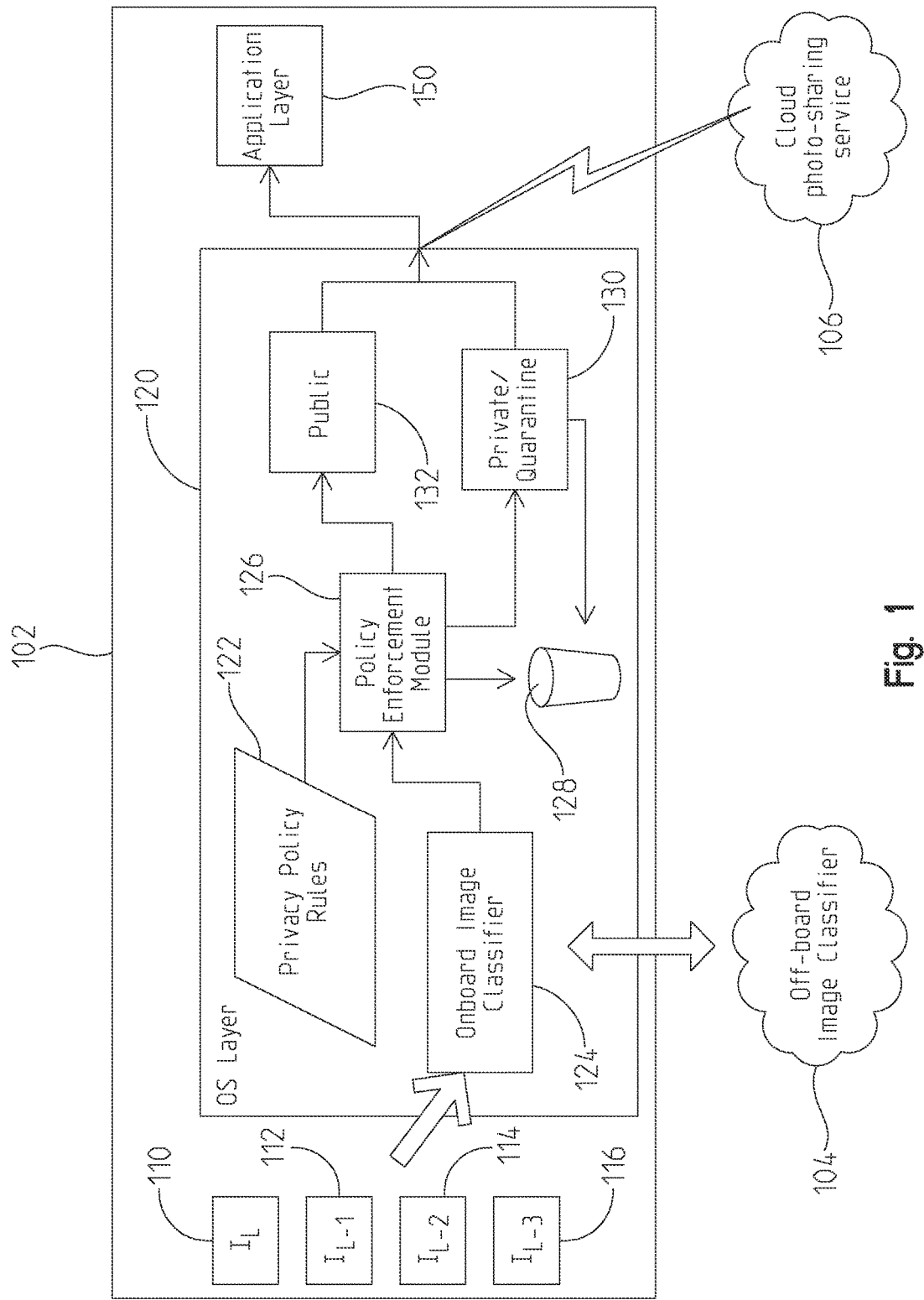
FIG. 1 is a diagram showing exemplary logical procedure for a system according to a first embodiment of the disclosure.

FIG. 1 shows an exemplary architecture embodiment that includes mobile image capture device 102, off-board image classifier 104, and external image service 106. Mobile image capture device 102 includes a plurality of captured images 110, 112, 114, 116, OS layer 120, and application layer 150. OS layer 120 includes privacy policy rules 122, onboard image classifier 124, policy enforcement module 126, and image classification buckets 128, 130, 132.

Privacy policy rules 122 establishes a set of blacklisted spaces. Each space in the policy includes a geospatial location, enrollment images or a model, a string identifier, an action to be taken for images that match the space policy, and a sensitivity value. Geospatial location can be as simple as traditional latitude and longitude where the space resides. Enrollment images are images taken by a user of the sensitive space to allow enrollment of the space into the privacy policy. It is also possible to receive a previously constructed model directly rather than enrollment images. String identifier is a title given to the space for convenient reference thereto. In the present embodiment, three defined actions are allowed. The three actions are make public, quarantine, and delete. The public action allows identified images to be freely distributed. The quarantine action places a hold on the images that requires explicit approval to release. The delete action eliminates the images.

Onboard image classifier 124 builds models 235 of locations and classifies new images using models. Off-board image classifier 104 operates similarly to onboard image classifier 124. The functions of the image classifiers 104, 124 can be performed individually or in combination by image classifiers 104, 124. Off-board image classifier 104 is illustratively a cloud-based service similar to the text-to-speech translation service used by Android and Apple iOS operating systems. Image classifier 124 processes individual images as well as jointly processes sequences of images. Onboard image classifier 124 further considers whether the received images are the product of an active or passive image collection. Active image collection (where a user actively, and assumedly, purposefully takes a picture) vs. passive image collection is also considered when classifying images. The assumption is that an actively collected image is more likely to be done with care and is certainly less likely to be an image gathered by an invasive program (virus, etc).

Once GPS has narrowed down a photo's location to a particular indoor structure, such structures are likely to be classified as either closed locales or open locales. Closed locales are those where the structure is of a manageable size such that all (or nearly all) of the possible spaces within a structure can be practically enrolled. In closed spaces, any received image is likely to be able to be assigned to a particular room for the given geospatial coordinates. Open spaces are those where it is not feasible to enroll every possible space. Open spaces introduce the possibility that a given image will not be able to be linked to a known space. Accordingly, policies are needed for open spaces that contemplate an inability to definitely assign an image to a known room with a specifically defined policy.

Policy enforcement module 126 takes data supplied by the image classifier 124 and applies the rules defined in the privacy policy 122. In one embodiment, policy enforcement module 126 operates according to a mechanism where user policies specify that sensitive photos are blocked from applications (application layer 150 and cloud photo-sharing services 106). Sensitive photos are placed into quarantine bucket 130 pending review by the user. The user can then release the photos to applications 150 or direct the photos to be destroyed (bucket 128). Each photo further provides an indication of the application or other entity that caused it to be taken. Accordingly, in the case of an invasive program, the program's operation is revealed such that the program can be removed, if desired. In still further embodiments, certain images can be directed for erasure (bucket 128) immediately rather than using quarantine 130 as a waypoint. Additionally, photos that do not raise privacy concerns can be distributed to applications (bucket 132).

As previously noted, geospatial information provides a first clue as to the location where a photo was taken. However, the granularity provided by the geospatial location is not always fine enough to restrict a location between multiple spaces that may have differing treatments. Still further, geospatial information alone is insufficient to determine the angle of the camera and what items were captured in a picture. Accordingly, additional processing is provided to provide additional detail on the likelihood for an image to contain private information.

Figure 2:
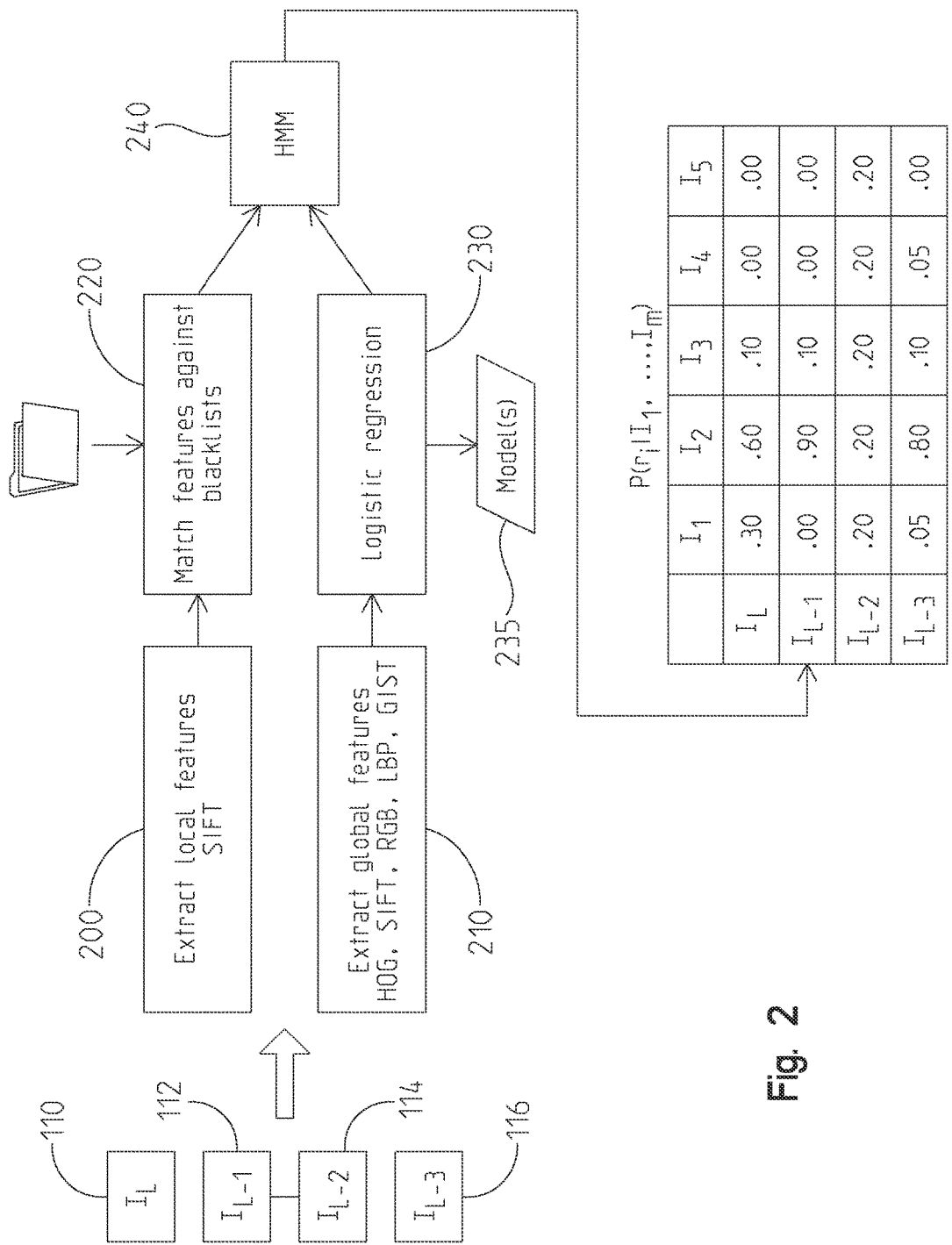
FIG. 2 is a diagram showing logical components of an image classification system of the system of FIG. 1.

FIG. 2 shows operations performed by policy enforcement module 126 in additional detail. The first portion of the processing includes the identification and utilization of local invariant features, blocks 200, 220. Local invariant features are those features which are highly distinctive and stable image points. These features are detected and encoded as high-dimensional vectors that are insensitive to image transformations (illumination changes, scaling, rotation, viewpoint changes, etc.). A second portion of the processing relies on global, scene-level features such as broad color distributions and texture patterns. These two portions are applied together as each has strengths over the other. The local features processing works well for clear pictures and works well for close-up pictures of individual objects. The global processing works well for blurry pictures.

Local features are classified using Scale Invariant Feature Transform (SIFT) processing, block 200. It should be appreciated that while the SIFT processing is used, embodiments are envisioned where other local invariant feature detector techniques are used. Similar processing is done in the preparation of a location model and in the analysis of an image to be classified. Location features are determined to create a feature list. The feature list ignores the spatial position of the feature, thus producing a raw list of features to be compared against. The image models further determine which entries in a feature list are distinctive (or at least relatively distinctive) with respect to the specific location. Such distinctive elements are given more weight when attempting to classify a taken image. For example, consistent architectural or design elements may reside throughout a home, or similar objects may exist throughout the offices of a building. Thus images are matched to models based on the number of distinctive local features that they have in common, 220.

In particular, a scoring function S is defined that evaluates a similarity between a test image I and a given set of SIFT features Mi corresponding to the model of room ri, $$S(I, r_i) = \sum_{s \in I} \mathbb{1}\left(\frac{\min_{s' \in M_i}\|s-s'\|}{\min_{s' \in M_{-i}}\|s-s'\|} < \tau\right), \quad \text{(Equation 1)}$$

where M−i is the set of features in all rooms except ri, i.e. M−i=∪rj∈R−[ri]Mj, 1(.) is an indicator function that is 1 if its parameter is true and 0 otherwise, ‖.‖ denotes L2 vector norm (Euclidean distance), and τ is a threshold. Intuitively, given a feature in a test image, this scoring function finds the distance to the closest feature in a given model, as well as the distance to the closest feature in the other models, and counts it only if the former is significantly smaller than the latter. This technique ignores non-discriminative features that occur in multiple models, counting only features that are distinctive to a particular room. To perform classification for image I, the room with the highest score is chosen.

Many first-person images do not have many distinctive features (e.g. blurry photos, photos of walls, etc.), causing local feature matching to fail since there are few features to match. Thus global, scene-level features are used to try to learn the general properties of a room, like its color and texture patterns, block 210. These features can give meaningful hypotheses even for blurry and otherwise relatively featureless images. Several types of global features of varying complexity are useful, including: 1) RGB color histogram, a simple 256-bin histogram of intensities over each of the three RGB color channels, yielding a 768-dimensional feature vector. 2) Color-informed Local Binary Pattern (LBP), which converts each 9×9 pixel neighborhood of an image into an 8-bit binary number by thresholding the 8 outer pixels by the value of the center pixel. A 256-bin histogram is built over these LBP values, both on the grayscale image and on each RGB color channel, to produce a 1024-dimensional feature vector. 3) GIST, which captures the coarse texture and layout of a scene by applying a Gabor filter bank and spatially down-sampling the resulting responses. One variant produces a 1536-dimensional feature vector. 4) Bags of SIFT, which extract SIFT features from the image but then vector-quantize each feature into one of 2000 "visual words" (selected by running k-means on a training dataset). Each image is represented as a single 2000-dimensional histogram over this visual vocabulary. 5) Dense bags of SIFT are similar but are extracted along a fixed grid instead of at corner points. Histograms are computed at three spatial resolutions (1×1, 2×2 and 4×4 grid, for a total of 21 histograms) and in each of the HSV color channels, yielding a 6,300 dimensional vector. 6) Bags of HOG computes Histograms of Oriented Gradients (HOG) at each position of a dense grid, vector-quantizes into a vocabulary of 300 words, and computes histograms at the same spatial resolutions as with dense SIFT, yielding a 6,300 dimensional vector. It should be appreciated that other general feature techniques are envisioned as well. Still further, modifications to the specific techniques listed above are also anticipated. Once features are extracted from labeled enrollment images, classifiers are learned using the LibLinear L2-regularized logistic regression technique, 230.

As previously noted, in addition to classifying individual images, photo streams are also collectively analyzed. The camera devices 102 often take pictures at regular intervals, producing temporally ordered streams of photos. These sequences provide valuable contextual information because of constraints on human motion: if image $I_i$ is taken in a given room, it is likely that $I_{i+1}$ is also taken in that room. Thus an approach was developed to jointly label sequences of photos in order to use temporal features as (weak) evidence in the classification. A probabilistic framework is used to combine this evidence. It is assumed that there is a set of photos $I_1; I_2; \ldots ; I_m$ ordered with increasing timestamp and taken at a roughly regular intervals. The goal is to infer a room label $l_i \in R$ for each image $I_i$. By Bayes' Law, the probability of a given image sequence having a given label sequence is, $P(l_1, \ldots, l_m | I_1, \ldots, I_m) \propto P(I_1, \ldots, I_m | l_1, \ldots, l_m) P(l_1, \ldots, l_m)$, where the denominator of Bayes' Law is ignored because the image sequence is fixed (given by the camera). If it is assumed that the visual appearance of an image is conditionally independent from the appearance of other images given its room label, and if it is assumed that the prior on room label depends only on the label of the image before (the Markov assumption), the probability can be rewritten as, $$P(l_1, \ldots, l_m | I_1, \ldots, I_m) \propto P(l_0) \prod_{i=2}^{m} P(l_i | l_{i-1}) \prod_{i=1}^{m} P(I_i | l_i). \quad \text{Equation 2}$$

The first factor $P(l_0)$ is the prior probability of the first room label. Assume here that this is a uniform distribution and can be ignored. The second factor models the probability of a given sequence of room labels, and should capture the fact that humans are much more likely to stay in a room for several frames than to jump randomly from one room to the next. A very simple model is used herein, $$P(l_i | l_{i-1}) = \begin{cases} \alpha, & \text{if } l_i \neq l_{i-1}, \\ 1 - (n-1)\alpha, & \text{otherwise}, \end{cases}$$

where n is the number of classes (rooms) and is a small constant (such as 0.01). Intuitively, this means that transitions from one room to another have much lower probability than staying in the same room. This prior model could be strengthened depending on contextual information about a place—e.g. due to the spatial layout of a home, it may be impossible to travel from the kitchen to the bedroom without passing through the living room first. The third factor of the equation models the likelihood that a given image was taken in a given room. Intuitively these likelihoods are produced by the local and global classifiers, but their outputs need to be converted into probabilities. Again from Bayes' Law, $$P(l_i | I_i) = \frac{P(I_i | l_i) P(l_i)}{P(I_i)}.$$

$P(I_i)$ is again ignored (since $I_i$ is observed and hence constant) and the prior over rooms $P(l_i)$ is assumed to be a uniform distribution, so it is sufficient to model $P(l_i | I_i)$. For the global classifiers, LibLinear's routines are used for producing a probability distribution $P_G(l_i | I_i)$ from the output of a multi-class classifier based on the relative distances to the class-separating hyperplanes. For the local features, a simple probabilistic model is introduced. Equation (1) defined a score $S(I, r_i)$ between a given image I and a room $r_i$, in particular counting the number of distinctive image features in $r_i$ that match I. This matching process is, of course, not perfect: the score will occasionally count a feature point as matching a room when it really does not. Suppose that the probability that any given feature match is correct is P. Now the probability that an image was taken in a room according to the local feature scores follows a binomial distribution, $$P_L(l_i | I_i) \propto \binom{N}{S(I, l_i)} \beta^{S(I, l_i)} (1 - \beta)^{N - S(I, l_i)}$$

where N is the total number of matches across all classes, $$N = \sum_{r_i \in R} S(I, r_i).$$

β is set to 0.9 in that the system is not very sensitive to this parameter unless it is set close to 0.5 (implying that correct matches are no more likely than chance) or to 1 (indicating that matching is perfect). To produce the final probability $P(l_i|I_i)$, we multiply together $P_L(l_i|I_i)$ and $P_G(l_i|I_i)$, treating local and global features as if they were independent evidence. The model in equation (2) is a Hidden Markov Model (HMM) 240, and fast linear-time algorithms exist to perform inference. HMM is used to perform two different types of inference, depending on the application. In a first use, it is desired to find the most likely room label $l_i^*$ for each image $I_i$ given all evidence from the entire image sequence, $$l_1^*, \ldots, l_m^* = \arg\max_{l_1,\ldots,l_m} P(l_1, \ldots, l_m^* | I_1, \ldots, I_m)$$

which can be solved efficiently using the Viterbi algorithm. In other applications, the marginal distribution may be computed—i.e., the probability that a given single image has a given label, based on all evidence from the entire image sequence—which can be inferred efficiently using the forward-backward algorithm. This latter approach gives a measure of classification confidence: a peaky marginal distribution indicates that the classifiers and HMM are confident, while a flat distribution reflects greater uncertainty.

The above-described system was evaluated using five datasets in a variety of indoor spaces. For each dataset, enrollment (training) photos were first collected that were deliberately taken by a human, who tried to take a sufficient number of photos to cover each room. This varied from 37 to 147 images per room, depending on the size of room and the user. For each dataset, between 3 and 5 rounds of enrollment images were taken at different times of the day, in order to capture some temporal variation (e.g. changes in illumination and in the scene itself). Stream (test) datasets were then collected, in which the person wore a first-person camera as they moved around the building. Because Google Glass, Memoto (Narrative Clip), and other devices are not yet commercially available, such devices were simulated with a smartphone worn on a lanyard around the person's neck. These smartphones ran an application that took photos at a fixed interval (approximately 3 seconds), and collection durations ranged from about 15 minutes to 1 hour.

The datasets consisted of three home and two workplace environments, each with 5 rooms (classes): House 1, a well-organized family home with three bedrooms, bathroom, and study. House 2, a sparsely-decorated single professional's home with a bedroom, office, bathroom, living room, and garage. House 3, a somewhat more cluttered family home with two bedrooms, a living room, kitchen, and garage. Workplace 1, a modern university building with common area, conference room, bathroom, lab, and kitchen. Workplace 2, an older university building with a common area, conference room, bathroom, lab, and office.

The datasets were collected independently by four individuals. The collectors simulated various daily chores during the stream collection, with the aim of obtaining realistic coverage across various rooms. For example, in Workplace 2 the collector obtained a cup of coffee, picked up printed material, spoke with the department's administrative assistant, and visited the conference room and common areas as detours. In House 1, the collector simulated various activities like visits to the bathroom, work in the study, reading, and organizing. In House 2, the collector performed various household chores with a high degree of movement, including cleaning, folding and putting away clothes, moving objects from room to room, etc. Table I presents detailed statistics on the datasets.

Single Image Classification, Local Features.

The classifier was first evaluated based on local invariant interest points. In addition to presenting raw classification accuracy statistics, the effect of various parameters on the accuracy of this approach was tested. To do this without overfitting to the test dataset, all results use the enrollment photos for both training and testing, using a crossvalidation approach. In particular, if a dataset has r rounds of enrollment photos, r classifiers are trained, in each case using r–1 rounds as training images and the other round as the test images, and then averaging the accuracies together. This methodology simulates a closed locale where each photo is known to have been taken in one of the enrolled spaces and the task is to classify amongst them.

Table II presents results of n-way classification for each of the five datasets (where here n=5 in all cases since there are 5 rooms in each dataset). The classification accuracies range across the datasets, from a high of 98.4% accuracy for House 1 down to 76.2% for House 2. This is not surprising, given that House 2 is sparsely decorated and so there are relatively few feature points for the local classifier to use. These results are compared to a baseline that simply chooses the largest class; even for House 2, the classifier beats this baseline by over 2.5 times. For images with few interest point descriptors, like blurry photos or photos of walls and other textureless surfaces, the local classifier has little information with which to make a decision. Table II shows the average number of distinctive features per image across the three datasets. When there are no features to match, or multiple rooms have the same (small) number of feature matches, the classifier resorts to a random guess amongst these rooms. The table shows the number of images for which this happened, as well as the number of images for which there were no matches at all (so that the classifier resorted to 5-way random guessing). The local feature classifier requires a threshold to determine whether a feature match is distinctive (Equation (1)). Intuitively, the larger the value of this threshold, the more feature points are considered during matching, but these points are less distinctive; the smaller the value, the matched feature points are much more accurate, but eventually become so few that there are many ties and most of the classifier's decisions are random guesses. It was empirically found that a value of about τ=0.45 performs best, and was used for all experiments presented herein. The technique is relatively insensitive to this parameter as long as it does not reach too close to 0 or 1.0. To test the effect of image resolution on accuracy of the local classifier, Table II also presents correct classification rates on images subsampled to 1 MegaPixel (MP). This subsampling also has the effect of decreasing the number of detected SIFT feature points, since SIFT uses heuristics based on image size to determine how many points to produce. Surprisingly, performance on the lower-resolution images either equals or beats that of the high-resolution image on all five datasets. This suggests that the limiting factor on performance is not image resolution, but perhaps image quality: all of the images were taken indoors without a flash, and include significant blur and sensor noise. Decreasing image resolution to 1MP thus does not decrease performance and in fact may help to reduce noise.

Single Image Classification, Global Features.

The global features detection includes building models of general scene-level characteristics instead of local level features. Table III compares classification performance of six global features, using the same evaluation criteria as with the local features—5-way classification using cross validation on the enrollment set. For the datasets with relatively few features, like the sparsely-decorated House 2, the best global features outperform the local features (78.8% vs 76.2% for House 2, and 93.9% vs 84.0% for Workspace 1), but for the other sets the local features still dominate. Since the two bags-of-SIFT and the bags-of-HOG features outperform the other global techniques by a significant margin for most datasets, embodiments are envisioned that use only these three.

Image Stream Classification

All of the enrollment photos were used for training, and the photo streams were used for testing. Inference was performed on the Hidden Markov Model (HMM) by using the Viterbi algorithm to find the most likely sequence of states, given evidence from the entire image stream.

Table IV shows the results of this step. When classifying single images, the global and local classifiers perform roughly the same, except for the sparsely-decorated House 2 where global features outperform local features by almost 8 percentage points. On average, the classifiers outperform a majority baseline classifier by almost 2.5 times. The HMM provides a further and relatively dramatic accuracy improvement, improving average accuracy from 64.7% to 81.9% for local features, and from 64.3% to 74.8% for global features. Combining the two types of features together with the HMM yields the best performance with an average accuracy of 89.8%, or over 3.3 times baseline.

Human Interaction.

This probabilistic approach naturally incorporates additional evidence, if available. For instance, a lifelogging application or the device operating system could ask the user to help label ambiguous images. A simple version of this was simulated by having the HMM identify the least confident of its estimated labels (i.e., the image with the lowest maximum marginal probability). That image was then forced to take on the true label by modifying $P(l_i|I)$ in equation (2) to be 1 for the correct label and 0 for the incorrect labels, and re-ran inference. This process was run 10 times, simulating the system asking the user to label 10 images. The last column of Table IV presents the results, showing a further increase in performance over the fully-automatic algorithm, and achieving over 90% accuracy for four of the datasets, and 95-100% accuracy for three of them.

Online Inference.

The HMM approach assumes that the entire photo stream is available—i.e., in labeling a given image, the classifier can see images in the past as well as in the future. This scenario is reasonable for photo-sharing, lifelogging and other applications that are tolerant to delay. For applications that require online, realtime decisions, the HMM can be modified to look only into the past (by running only the forward pass of the Forward-Backward Algorithm), albeit at a reduced accuracy: average HMM performance across the five datasets falls from 89.8% to 82.6% in this case.

Impact of Scene Occlusion.

First-person images are often capturing highly dynamic scenes with moving objects and people, and this often causes large portions of a scene to be occluded by foreground subjects in the photographs. These occlusions increase the difficulty of indoor place recognition, but they are expected to be commonplace—in fact, potential occlusions may be the basis for defining a room as sensitive in a privacy policy. (For instance, empty bathrooms are usually innocuous, but photos of people in the bathroom elicits much greater concern.)

While the test streams did include some incidental occlusions, it was desired to measure the effect that more frequent occlusions would have on classifier accuracy. To do this, a dataset was generated with simulated occlusions, superimposing a human silhouette (which blocked about 30% of the image pixels) on varying fractions of the images (between 0% and 100%). Table V presents classifier accuracies on these images on the Workspace 2 dataset (which was chosen because it had relatively high performance with both types of individual features and the stream classifier). It was observed that local feature classifier performance declines as more images are occluded, while the accuracies of the global features and HMM are relatively stable, decreasing by less than a percentage point.

Retrieving Private Images

Figure 3C:
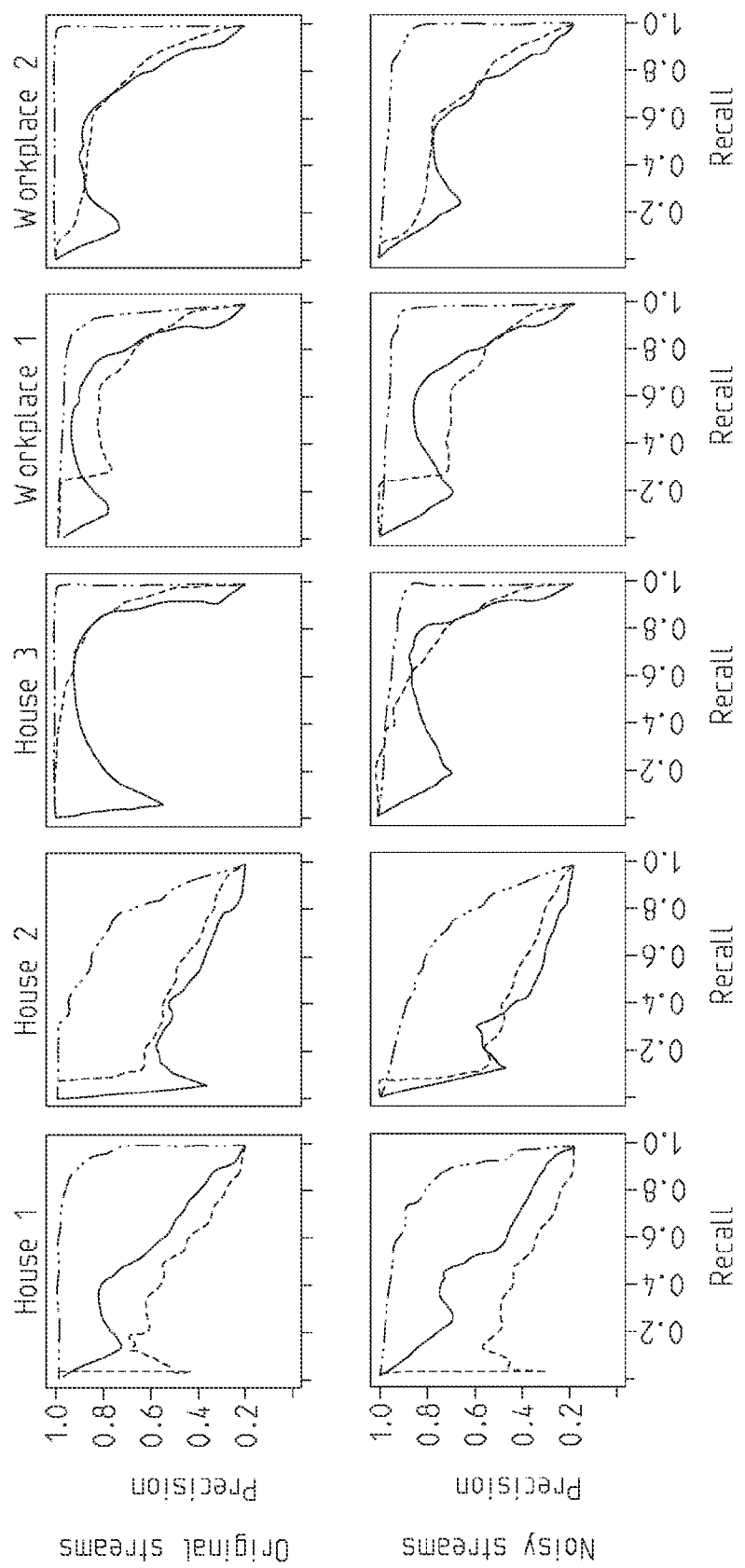
FIG. 3 is a plurality of graphs showing precision-recall curves for retrieving private images when using one classification system of the present disclosure.

The discussion above casts the problem as one of image classification: given an image known to have been taken in one of n rooms, identify the correct room. A goal of system, however, is not necessarily to identify the exact room, but to filter out images taken from some subset of potentially private rooms. This is an image retrieval problem: given a stream of images, it is desired to retrieve the private ones, so that they can be filtered out. Since the classification algorithms are imperfect, the user could provide confidence thresholds to select between a highly conservative or a highly selective filter, depending on their preferences and the degree of sensitivity of the spaces. The top row of FIG. 3 shows precision-recall curves for retrieving private images from each of our five datasets. To generate these, five retrieval tasks were conducted for each dataset, one for each room, and then averaged the resulting P-R curves together. For the local and global features the maximum value (across classes) of $P_L(l_i|I)$ and $P_G(l_i|I)$ were used, respectively, and for the HMM the maximum marginal (across classes) of $P(l_i|I_1, \ldots, I_m)$ was used computed by the Forward-Backward algorithm. For House 1, House 3, and Workspace 2, 100% recall is achieved at greater than 70% precision, meaning that all private images could be identified while only accidentally removing 30% of the harmless images. For Workspace 1 about 90% precision and recall is achieved, whereas for the very difficult House 2, about 40% precision is possible at 90% recall.

The above results reflect the closed scenario, where it is assumed that the user has enrolled all possible rooms in the space. To evaluate the open locale scenario, synthetic streams were created in which randomly-chosen segments of streams were inserted from other datasets, such that about 20% of the images in these noisy streams were in the 'other class' category. The bottom row of FIG. 3 shows the precision-recall curves in this case. While retrieval accuracy degrades somewhat compared to the original streams, in three of the datasets (House 3 and the two Workspaces) nearly 100% recall at greater than 80% precision is observed. For the vast amounts of photos obtained in lifelogging applications, such precision values are reasonable as they still leave a large fraction of harmless images for sharing. The blocked photos can be reviewed manually to identify such false classifications.

It was observed that the performance of the system was at least partially negatively affected by the intensity of the processing necessary as part of the image classificaiton. Accordingly, in such cases, off-board image classifiers 124 may be employed. Furthermore, additional classification processing can be done in the off-board setting so as to increase the accuracy and confidence of the results.

It should also be appreciated that while images that are filtered out due to being taken from potentially private rooms or potentially containing private information, treatments thereof are envisioned other than deletion (preventing their use) and quarantine. Indeed, embodiments are envisioned where identified images are censored (whole or in part) such as by blurring to obscure private content.

The software operations described herein can be implemented in hardware such as CPUs, GPUs, and/or discrete logic fixed function circuits including but not limited to state machines, field programmable gate arrays, application-specific circuits or other suitable hardware. The hardware may be represented in executable code stored in non-transitory memory such as RAM, ROM or other suitable memory in hardware descriptor languages such as, but not limited to, RTL and VHDL or any other suitable format. The executable code when executed may cause an integrated fabrication system to fabricate an IC with the operations described herein.

Also, integrated circuit design systems/integrated fabrication systems (e.g., work stations including, as known in the art, one or more processors, associated memory in communication via one or more buses or other suitable interconnect and other known peripherals) are known that create wafers with integrated circuits based on executable instructions stored on a computer-readable medium such as, but not limited to, CDROM, RAM, other forms of ROM, hard drives, distributed memory, etc. The instructions may be represented by any suitable language such as, but not limited to, hardware descriptor language (HDL), Verilog or other suitable language. As such, the logic, circuits, and structure described herein may also be produced as integrated circuits by such systems using the computer-readable medium with instructions stored therein. For example, an integrated circuit with the above-described software, logic and structure may be created using such integrated circuit fabrication systems. In such a system, the computer readable medium stores instructions executable by one or more integrated circuit design systems that cause the one or more integrated circuit design systems to produce an integrated circuit.

The above detailed description and the examples described therein have been presented for the purposes of illustration and description only and not for limitation. For example, the operations described may be done in any suitable manner. The method may be done in any suitable order still providing the described operation and results. It is therefore contemplated that the present embodiments cover any and all modifications, variations or equivalents that fall within the spirit and scope of the basic underlying principles disclosed above and claimed herein. Furthermore, while the above description describes hardware in the form of a processor executing code, hardware in the form of a state machine or dedicated logic capable of producing the same effect are also contemplated.

What is claimed is:

1. A method classifying collected images including:
    obtaining, based on a geospatial location of a computing device coupled to an image collection device, a known set of images for the geospatial location;
    comparing, by the computing device, a plurality of captured images to the known set of images to determine a plurality of corresponding determined locations within the geospatial location; and
    applying a classification upon a captured image, from the plurality of captured images, based upon a corresponding determined location, from the plurality of corresponding determined locations, associated with the captured image and whether the corresponding determined location indicates that the captured image has a potential to depict privacy sensitive information,
    wherein the applying the classification is based on using a scoring function that evaluates a similarity between the captured image and the known set of images and a probabilistic model that is based on a chronological sequence of the plurality of captured images and the plurality of corresponding determined locations associated with the chronological sequence.

2. The method of claim 1, wherein the classification is further based upon whether the captured image is a product of an active or passive collection method.

3. The method of claim 1, wherein the classification is further based upon an application that caused the image to be captured.

4. The method of claim 1, wherein the captured image was captured at the geospatial location.

5. The method of claim 1, wherein the classification is further based upon local invariant features depicted in the captured image that are highly distinctive to a particular location.

6. The method of claim 1, further including providing the applied classification to a computing element having access to the captured image, the computing element having access to the captured image choosing a treatment of the captured image responsive to the received classification, choosing treatment includes choosing between 1) allowing general use of the captured image by other computing applications, 2) requiring explicit approval from a user to allow use of the captured image by other computing applications, and 3) preventing use of the captured image or portion of the image by other computing applications.

7. The method of claim 6, wherein preventing use of the captured image by other computing applications includes deleting the captured image.

8. The method of claim 1, wherein the classification is further based upon a second image known to be taken 1) within a pre-defined temporal boundary of when the captured image was taken or 2) immediately preceding or succeeding the taking of the captured image.

9. An image handling device including:
    an image capturing device;
    one or more applications able to utilize images from the image capturing device;
    memory storing instructions, that when interpreted by a processor instantiate a system layer logically disposed between the image capturing device and the one or more applications such that images captured by the image capturing device must pass through the system layer prior to being made available to the one or more applications;
    the system layer including:
        an image classifier operable to:
            obtain, based on a geospatial location of the image handling device, a plurality of known images for the geospatial location; and
            determine a classification of a captured image, from a plurality of captured images, based on comparing the captured image to the plurality of known images and using a probabilistic model based on a chronological sequence of the plurality of captured images, wherein each of the plurality of captured images has a corresponding determined location within the geospatial location;
        an image policy enforcer operable to apply a plurality of image policy rules to the captured image based on the classification of the captured image by the image classifier, at least one image policy rule including an action to be taken for the captured image that matches the at least one image policy rule, and a sensitivity value associated with the geospatial location;

the image policy enforcer operable to choose the action based on the at least one image policy rule between:

1) making the captured image freely available to the one or more applications;
2) making the captured image or portion of the captured image unavailable to applications; and
3) holding the captured image and requiring explicit approval from a user prior to making the captured image available to the one or more applications.

10. The image handling device of claim 9, wherein the image classifier applies classifications upon the images based upon a determined location depicted therein and whether the determined location indicates that the images have a potential to depict privacy sensitive information.

11. The image handling device of claim 10, wherein the classification is further based upon whether the captured image is a product of an active or passive collection method.

12. The image handling device of claim 9, wherein the plurality of known images are images known to be taken at the geospatial location.

13. The image handling device of claim 9, wherein the determining the classification is based upon an application of the one or more applications that caused the captured image to be captured.

14. The image handling device of claim 9, wherein the captured image was captured at the geospatial location.

15. The image handling device of claim 9, wherein the determining the classification is based upon global scene-level features of the captured image.

16. The image handling device of claim 15, wherein the global scene-level features include color and texture patterns.

17. The image handling device of claim 9, wherein the determining the classification is based upon a second image known to be taken 1) within a pre-defined temporal boundary of when the captured image was taken or 2) immediately preceding or succeeding the taking of the captured image.

18. A non-transitory computer readable media including instructions thereon that, when interpreted by a processor, cause the processor to:

obtaining, based on a geospatial location of a computing device coupled to an image collection device, a known set of images for the geospatial location;

compare a plurality of captured images to the known set of images to determine a plurality of corresponding determined locations within the geospatial location; and apply a classification upon a captured image, from the plurality of captured images, based upon a corresponding determined location, from the plurality of corresponding determined locations, associated with the captured image and whether the corresponding determined location indicates that the image has a potential to depict privacy sensitive information, wherein the applying the classification is based on using a scoring function that evaluates a similarity between the captured image and the known set of images and a probabilistic model that is based on a chronological sequence of the plurality of captured images and the plurality of corresponding determined locations associated with the chronological sequence.

19. The method of claim 1, wherein the probabilistic model is further based on a spatial layout corresponding to the geospatial location.

20. The method of claim 1, wherein the probabilistic model indicates a probability that the captured image was captured in the corresponding determined location associated with the captured image.

* * * * *